Dec. 6, 1966  J. H. LEE  3,289,525
POSITIVE RELEASE PIN-TYPE CLAMP
Filed March 16, 1964
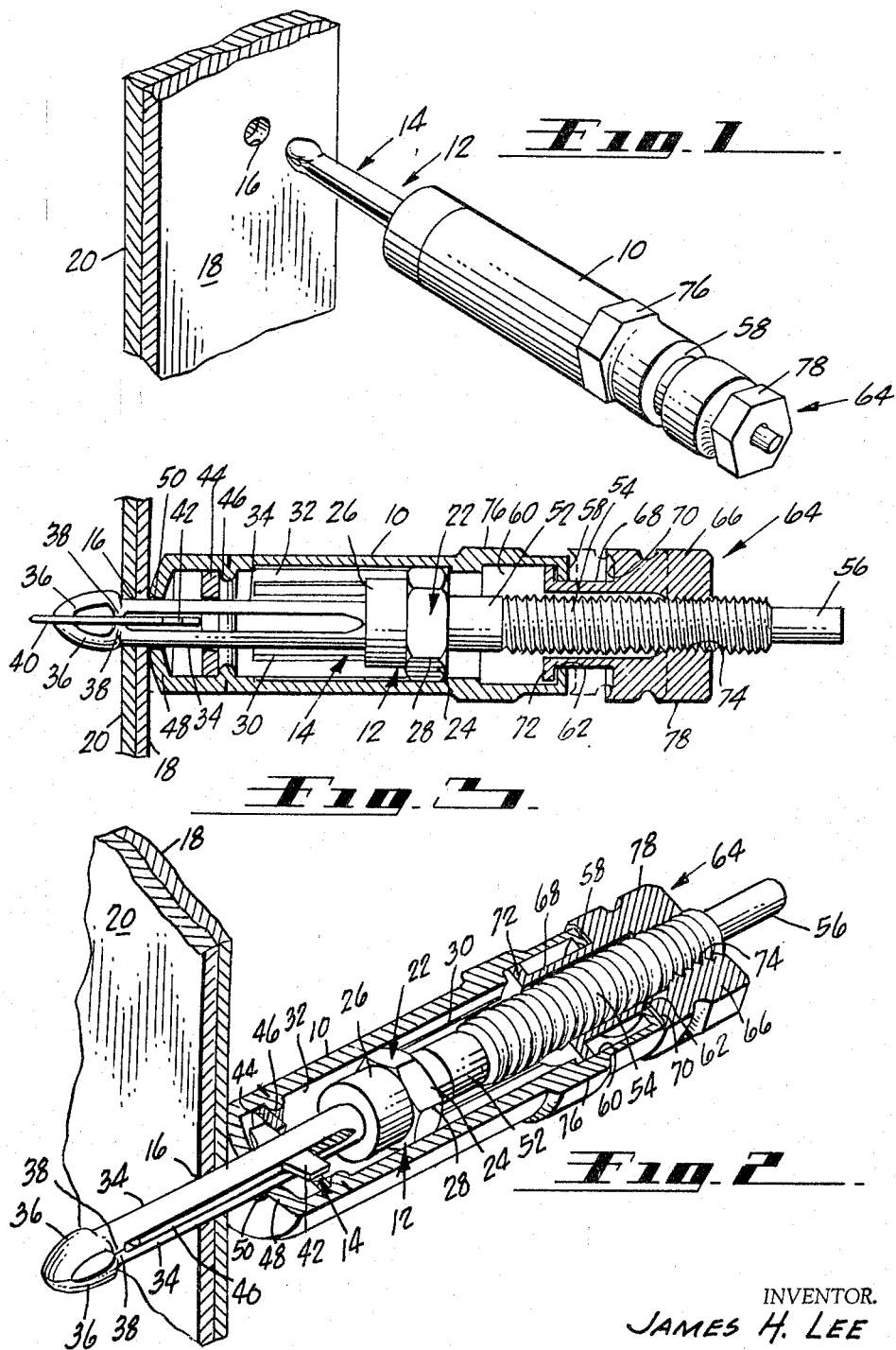
INVENTOR.
JAMES H. LEE
BY
Edwin Coates
ATTORNEY United States Patent Office 3,289,525
Patented Dec. 6, 1966

3,289,525
POSITIVE RELEASE PIN-TYPE CLAMP
James H. Lee, Lawndale, Calif., assignor to Monogram Industries, Inc., Culver City, Calif.
Filed Mar. 16, 1964, Ser. No. 352,063
2 Claims. (Cl. 85—81)

This invention lies in the field of pin type clamps which are used to temporarily secure a plurality of work pieces, usually sheets or plates, in assembled relation while some operation such as drilling, riveting, or machining is performed on them, and its relates particularly to a clamp of this type which is constructed and arranged for positive release from the work pieces after its function is completed.

There have been many varieties of pin type clamps developed over a period of years for use as temporary fasteners. The majority of them have included a compact body, generally cylindrical, and pin means extending from one end and adapted to pass through aligned apertures in the work pieces. The pin means were adapted to engage the remote side of the assembly and means were carried by the body to retract the pin means and clamp the assembly together. A coil spring adapted to be compressed by a special plier like tool is commonly used in clamps which are used to hold an assembly of relatively thin metal sheets, etc., but does not produce enough clamping pressure for assemblies which include thicker sheets or plates or other structural members which require a high degree of force to clamp them tightly enough together for the working they are to undergo.

One of the most used and most satisfactory clamps of this general type for heavy duty use in recent years comprises a generally cylindrical body or shell having a passage therethrough which slidably receives a retainer member. The latter has a split pin extending out the forward end of the body and the free ends of the pin halves are formed with partial heads. A flat, stationary spreader bar extends forward from the body and between the pin halves. The latter have small inwardly facing protuberances adjacent the free ends which clear the forfard end of the spreader bar when in their most advanced or extended position, allowing the pin to collapse laterally, and ride up on the flat faces of the spreader bar as the pin is retracted to expand the pin laterally, including both the shank and the head portions. Thus, the pin is first extended and collapsed, then inserted in aligned openings in the work pieces to be clamped into an asembly, and then retracted and expanded laterally. The expansion enlarges the head portions sufficiently to prevent their passage through the openings, and enlarges the shank portions sufficiently to fit snugly or tightly in the openings and maintain them in alignment. Continued retraction clamps the work pieces between the head portions and the fore end of the clamp body.

In order to accomplish retraction and clamping, the retainer member includes a threaded shank connected to the split pin and extending through the aft end of the clamp body. An ordinary nut is threaded on this shank and is run up against the aft end of the body. When a wrench is used to draw the nut up on the shank its exerts a thrust force which retracts the split pin, bringing the head against the remote side of the assembly and applying clamping pressure to the work pieces. The tight fit of the shank portions of the pin is by design because the proper relation of the work pieces in the assembly depends on the alignment of the openings, and the alignment in turn depends upon the tight fit.

From dozens to hundred of these clamps are used in large assembly operations such as securing airplane fuselage skins to the framing. To speed up application of the clamps, nut runners have been widely adopted. Modern nut runners include a stationary restraining sleeve and a rotatable driving tool, both of which are normally in the form of hex sockets. The clamp body and the nut are provided with matching formations so that the nut runner will hold the body stationary while the nut is run up as tightly as desired. For this purpose the driver is provided with a torque limiting adjustment.

While the nut runners have pretty well solved the problem of high speed application of clamps of this type, they have not solved the problem of high speed removal. They merely back the nut off so that it no longer exerts a thrust force. The lateral expansion of the shank portion of the pin mentioned above results in a binding fit in the openings in the work pieces, and it is extremely difficult to remove. When hand pressure is insufficient, the workman usually resorts to hammering the aft end of the threaded shank constituting a part of the retainer member with anything available, including the nut runner tool itself. This results in damage to both the tool and the clamp, and very frequently also to the work in which the clamp is inserted. Efforts have been made to overcome this difficulty but none has been successful until the present invention.

The basic construction of the clamp body and working parts of the new clamp is similar to that of the clamp described above, but it is so modified that the "backing-off" action of the drive nut positively pushes the retainer member forward through the clamp body until the inner protuberances on the shank halves of the split pin clear the fore end of the spreader bar, enabling the pin to collapse laterally so that the shank portions no longer bind in the openings in the work pieces. The clamp may then be removed as readily as it was originally inserted.

The drive nut is directly and positively connected to the aft end of the clamp body or casing and is free to rotate with respect to the casing. The extent of axial movement is limited. It may be just adequate clearance to permit free rotation of the nut, but in the preferred embodiment it is more than that, as explained below. In the presently preferred form, the casing is generally open at the aft end but terminates in an inwardly directed flange to form an axial and radial recess. The drive nut is formed with an outwardly directed flange at its forward end which engages in the casing recess to prevent separation of the parts and to limit relative axial movement. With this arrangement, when the nut is backed off to release the clamp, the flange of the nut encounters the casing flange forming the rear wall of the recess, and further rearward movement is blocked. Continued rotation of the nut results in pushing the threaded shank forward. The final result is that the split pin is pushed forward to its collapsing position so that it no longer binds in the openings in the work pieces.

The casing recess is long enough to permit the nut to move axially a distance equal to the advance of several threads of the threaded shank. The aft end of the shank is smooth and slightly smaller than the root diameter of the threads. With this combination and with the thread termination properly located when the retainer member is fully extended, the rearward position of the nut after having extended the retainer member is such that it disengages from the shank and spins freely rather than being jammed against a stop by excess operation of the driving tool. Since it is now at the rear of its axial movement it can be freely moved forwardly with the fingers to re-engage a plurality of threads before assuming the load of moving the retainer member.

Another advantage of the lost motion connection of casing, drive nut, and shank is that when the clamp is tightly engaged and it is desired to release it, the power tool is applied and the drive nut rotates freely a plurality of turns before its flange encounters the casing flange to apply the thrust force. During this free movement the rotatable driving tool is enabled to develop considerable speed and momentum, which greatly increases the force available to break the clamp loose.

Various other advantages and features of novelty will become apparent as the description proceeds in conjunction with the accompanying drawing, in which:

FIGURE 1 is a rear perspective view of the clamp of this invention in position to be applied to aligned apertures in an assembly of work pieces;

FIGURE 2 is a front perspective view, partly in section, of the clamp in position in the assembly ready to be tightened in place; and FIGURE 3 is a side sectional view of the clamp in binding and clamping engagement with the work, and ready to be released.

The preferred form of the invention is shown generally in FIGURE 1, in which a clamp body 10 carries a retainer member 12 including a split pin 14 in position to enter into aligned apertures 16 in the assembly of work pieces 18 and 20. In FIGURE 2, the clamp is shown with the split pin inserted in the apertures 16. It will be seen that retainer member 12 includes a base 22 having a hexagonal portion 24 and a cylindrical portion 26 integral therewith. Points 28 of the hexagonal portion slide in splines 30 broached in the inner wall surface 32 of casing 10 and prevent rotation.

Split pin 14 is made unitary with member 26 by welding or other suitable means and comprises a pair of shank halves 34 each having a head portion 36 and an inwardly directed protuberance 38. Spreader bar 40, having a cross head 42, is held fixedly in place by means of washer 44 between internal bead 46 and the blunt fore end 48 of the casing. End 48 has a passage 50 for free movement of split pin 14. Drive shank 52 is preferably integral with base 22 and extends rearwardly therefrom. The major portion of its length bears threads 54 and the aft end 56 is smooth and cylindrical and of slightly smaller size than the root diameter of the threads 54.

Casing 10 has an inturned flange 58 at its aft end to define an axially and radially extending recess 60 and a pasage 62. A drive nut 64 has a main body portion 66 and a reduced diameter forward portion 68 which forms with it a shoulder 70, the forward portion terminating in an outwardly extending collar 72 which is freely slidable and rotatable in recess 60, the reduced portion 68 being freely slidable and rotatable in passage 62. Body 66 is provided with internal threads 74 engageable with threads 54 on drive shank 52. Casing 10 bears a hex formation 76 for engagement by the restraining sleeve of a nut runner, and body 66 bears a similar and slightly smaller formation 78 for engagement by the rotatable driving tool of the nut runner.

In the position of the parts shown in FIGURE 2, the clamp has been inserted in the work and the drive nut 64 has been run up on the drive shank until its shoulder 70 bears against flange 58. At this point the nut runner is applied, and its restraining sleeve engages formation 76 to prevent rotation of casing 10 while its rotatable driving tool engages formation 78 to drive nut 64. When power is applied, nut 64 rotates on shank 52. Since the nut can advance no farther, shank 52 is retracted, or drawn rearwardly. As it does so, protuberances 38 ride up on the spreader bar 40 and expand split pin 14, causing shank halves 34 to bear tightly against the walls of apertures 16 and enlarging head 36 sufficiently so that it will no longer pass through apertures 16. Consequently, when shank 52 has been drawn sufficiently rearwardly, head 36 will bear against the remote side of the assembly of plates 18 and 20 and will clamp them tightly against the forward end 48 of casing 10. Usually a large number of the clamps are applied to one or more sets of plates like 18 and 20 and operations are carried on between the clamping locations, such as drilling, riveting, or machining.

When these operations are completed and it is desired to remove a clamp, the nut runner is again applied and the rotatable driving tool is operated in the reverse direction. In the first stage, the nut runs freely on shank 52 until its collar 72 contacts flange 58 of casing 10, which is the position shown in FIGURE 3. During this free running the driving tool builds up speed and momentum so that when the rearward progress of nut 64 is suddenly arrested by contact between collar 72 and flange 58 the momentum helps to break the retainer member loose via the threaded connection of the nut with the shank against the static friction between pin shank halves 34 and the walls of apertures 16. Continued rotation of the nut positively pushes the split pin forward out of the casing 10 until protuberances 38 ride off the forward end of spreader bar 40 and the split pin collapses laterally and becomes free in the passages 16 so that the clamp can be readily removed from the work. The dimensions of the working parts are so chosen that when the retainer member is in its farthest forward position and the nut is in its farthest rearward position the nut disengages from threads 54 and it spins freely on section 56. Thus there is no thread jamming on release.

The free axial movement of drive nut 64 provided by recess 60 prevents thread damage upon applying the nut runner for the next clamping operation because the nut can now be run up by hand onto threads 54 of the shank until shoulder 70 again contacts flange 58 and the parts are again in the position of FIGURE 2. At this time there are a plurality of threads, usually three to five, in full engagement before the nut has to assume the load of retracting the retainer member. Section 56 acts as a pilot for threads 74 to assist them in smooth re-engagement with threads 54 of the drive shank.

From the above it will be seen that the clamp of this invention provides a positively gripping force for holding apertured plates and the like in proper relative position for various manufacturing operations and also positively releases itself from the work when its function has been accomplished.

It will be apparent to those skilled in the art that various changes, modifications, and additions may be made in the construction disclosed without departing from the spirit of the invention and it is intended that all such changes, modifications, and additions shall be embraced within the scope of the following claims.

I claim:

1. An axial, pin type clamp for temporarily holding a plurality of apertured work pieces in assembled relation with the apertures in alignment, comprising: an elongate generally hollow casing having a substantially closed forward end adapted for clamping engagement with a work piece and formed with an axial passage therethrough, and having an inturned flange at its aft end to provide within said aft end an axially extending annular recess having a smooth inner surface; a retainer member slidably and non-rotatably mounted in said casing; said retainer member having a base slidable within said casing, a gripper extending through the passage at the forward end, and a drive shank extending through the aft end, the shank being at least partly threaded; and a drive nut mounted for limited axial movement having a threaded bore for engagement with the threaded portion of the shank to move the retainer member axially; said limited axial, slidable, movement of said nut having an extent equal to the advance of a plurality of said threads so that the nut will re-engage a plurality of threads on the drive shank before assuming the load of retracting the retainer member; said nut having an aft tool engaging portion and a forward portion of reduced diameter terminating in an outward flange at its forward end, said second flange being located in said recess in the casing for sliding axial movement and rotatable movement; the flanges serving as abutments to prevent separation of the drive nut from the casing and to take the thrust force of the nut; said gripper having a headed free end and being collapsible upon forward extension to pass through the apertures in the work piece assembly, and expandable laterally upon rearward retraction to tightly engage the walls of the apertures and to cause the headed free end to engage the remote surface of the assembly to grip the latter between the headed free end and the forward end of the casing; said drive nut acting to forcefully and positively move said gripper into and out of binding engagement with the walls of said aperture and said headed free end into and out of clamping engagement with the assembly.

2. An axial, pin type clamp for temporarily holding a plurality of apertured work pieces in assembled relation with the apertures in alignment, comprising: an elongate generally hollow casing having a substantially closed forward end adapted for clamping engagement with a work piece and formed with an axial passage therethrough, and having means extending radially inwardly of said casing at its aft end to provide within said aft end an axially extending annular recess having a smooth inner surface; a retainer member slidably and non-rotatably mounted in said casing; said retainer member having a base slidable within said casing, a gripper extending through the passage at the forward end, and a drive shank extending through the aft end, the shank being at least partly threaded; and a drive nut mounted for limited axial movement having a threaded bore for engagement with the threaded potrion of the shank to move the retainer member axially; said limited axial, slidable, movement of said nut having an extent equal to the advance of a plurality of said threads so that the nut will re-engage a plurality of threads on the drive shank before assuming the load of retracting the retainer member; said nut having an aft, tool engaging portion and a forward portion of reduced diameter terminating in a radially outwardly extending member at its forward end, and being located in said recess in the casing for sliding axial movement and rotatable movement; the means extending inwardly of said casing and the radially outwardly extending member on said nut serving as abutments to prevent separation of the drive nut from the casing and to take the thrust force of the nut; said gripper having a headed free end and being collapsible upon forward extension to pass through the apertures in the work piece assembly, and expandable laterally upon rearward retraction to tightly engage the walls of the apertures and to cause the headed free end to engage the remote surface of the assembly to grip the latter between the headed free end and the forward end of the casing; said drive nut acting to forcefully and positively move said gripper into and out of binding engagement with the walls of said aperture and said headed free end into and out of clamping engagement with the assembly.

References Cited by the Examiner

UNITED STATES PATENTS

| | | |
|---|---|---|
| 2,256,634 | 9/1941 | Webb. |
| 2,368,408 | 1/1945 | Brooking. |
| 2,775,155 | 12/1956 | Tompkins et al. _____ 85—81 |
| 3,144,805 | 8/1964 | Lee _____ 85—81 |

CARL W. TOMLIN, *Primary Examiner.*

EDWARD C. ALLEN, *Examiner.*

R. S. BRITTS, *Assistant Examiner.*